March 21, 1939.  J. G. GROENDYK  2,151,099
TROLLEY WIRE GUARD
Filed Dec. 7, 1938
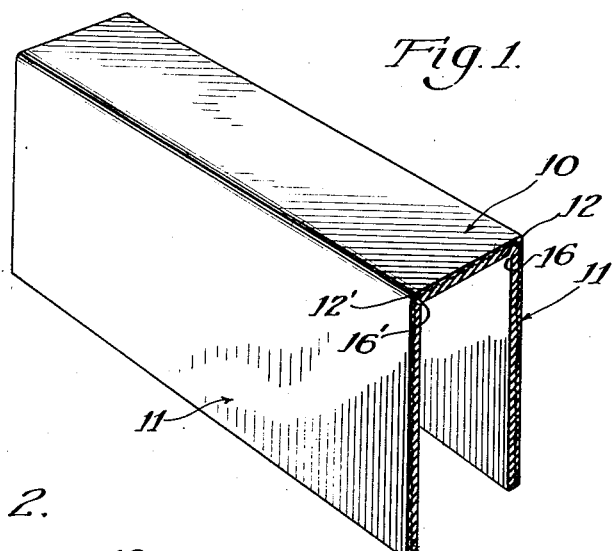
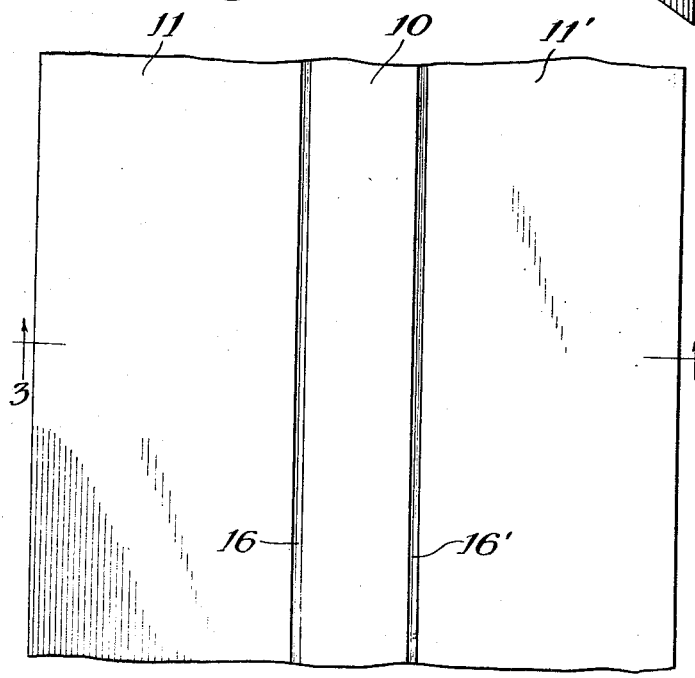
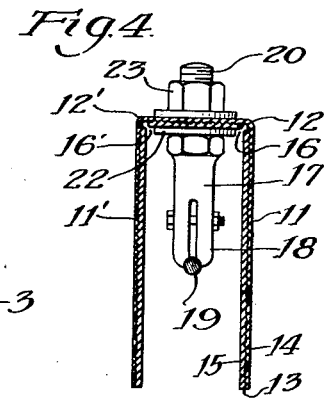
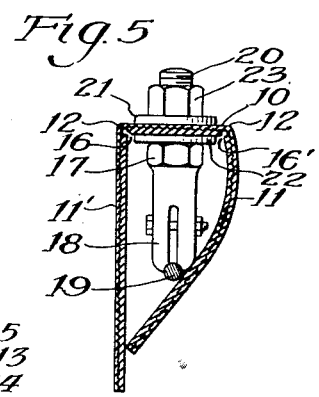
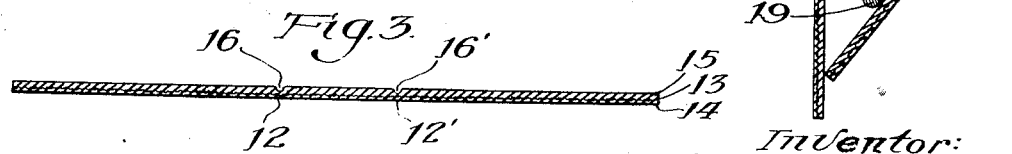
Inventor:
James G. Groendyk,
By: Lee J. Gary
Attorney Patented Mar. 21, 1939

2,151,099

UNITED STATES PATENT OFFICE 2,151,099

TROLLEY WIRE GUARD

James G. Groendyk, Passaic, N. J., assignor to Raybestos-Manhattan, Inc., Passaic, N. J., a corporation of New Jersey Application December 7, 1938, Serial No. 244,377

9 Claims. (Cl. 191—35)

This invention relates to improvements in trolley wire guards, and particularly to a flexible guard adapted for protective use in conjunction with overhead trolley wires which are of necessity hung relatively low with respect to the heads of men, such as in mines.

In many mines the live trolley wire is protected by wooden guards. Trolley poles often jump the trolley wire, knocking down the board insulation, and either the board shielding or the trolley pole is broken. There is also danger of workers being injured by the falling boards. Also, boards are usually creosoted, and require two men to install, thereby running up installation costs. Further, wood is a conductor of electricity when wet, and again due to the rigidity of such installations injuries are caused to workingmen by striking their heads against the boards.

It is an object of this invention to provide a trolley wire guard suitable for protecting men and animals in mines against the dangers of live trolley wires by means which do not of themselves form an added source of potential injury to life or to equipment.

Another object is to provide a trolley wire guard which is an excellent electrical insulator and which is fully flexible and can yield laterally so as to either conform about the trolley wire to form a complete enclosure therefor when it is struck from its outer side, or can be spread apart when struck from the interior by the trolley pole, and yet immediately thereafter returns to its normal configuration.

Another object is to provide a trolley wire guard constructed essentially of flexible rubber and yet which retains its form and protective position without the aid of metallic inserts, shaping clips, spacer arms or bars or such other aids, and which can be installed on conventional trolley wire hanging equipment without additional supplies, attachments or special equipment, and can be economically installed with a small amount of labor, and yet has great durability and long effective life.

A further object relates to the novel and unitary construction of the trolley wire guard, whereby long lengths thereof can be rolled in the form of flat sheets and thus economically transported or stored, and yet when installed on and by means of conventional overhead trolley wire equipment, will of itself readily and immediately conform itself to a predetermined guarding contour.

Other objects relate to further economies of use and construction of my invention, and the arrangement of its parts, which will be apparent from a consideration of the following specification and drawing, wherein:

Fig. 1 is a perspective view of a section of my trolley wire guard.

Fig. 2 is a fragmentary view of a length of trolley wire guard material viewed from its under side illustrating its form prior to installation, and, Fig. 3 is a transverse section thereof on the line 3—3 of Fig. 2.

Fig. 4 is a transverse section of my trolley wire guard installed on a trolley wire hanger and in its normal position.

Fig. 5 is a view similar to Fig. 4, illustrating the flexing of one of the depending flanges or guard curtains to protective position when accidentally struck.

Referring to the drawing, my trolley wire guard is shown in its operative conformed position of Fig. 1, to be substantially in the form of a channel, and comprises the web portion 10, and the flanges 11 and 11', which may also be termed guard curtains. These guard curtains are formed integrally with the web portion and are hinged thereto at 12—12'.

The guard is formed of a relatively soft and resilient rubber, and preferably comprises an embedded fabric strength member, which may be at least one thickness of woven material, such as duck, or other rubberized fabric. Thus a layer of fabric 13 is embedded within rubber, or the rubber is built up on its surfaces so as to provide two surfaces thicknesses of rubber, 14 and 15, the latter being of greater thickness than the former.

In order to provide the unitary and integral construction, the rubber sheet formation is provided with a pair of parallel substantially semicircular grooves 16 and 16' extending longitudinally thereof, and spaced so as to set apart the web 10 and the flanges 11, 11'. The depth of these grooves is such as to extend through the major depth of rubber thickness 15, so that the fabric 13 at the point of greatest channel depth is covered with a thickness of rubber substantially equal to thickness 14 on its outer side.

It will of course be readily seen that by reason of the formation of these spaced apart grooves 16—16' and the reduction of rubber thickness at these points, without, however, appreciably weakening the sheet due to its internal flexible reinforcement 13, lines of surface breaking are formed. Thus when the composite grooved sheet of Figs. 2 and 3 is positioned as in Fig. 1, whereby the web portion 10 is extended horizontally and with the grooves 16—16' on its under side, the curtain portions 11—11' will readily bend downwardly therefrom turning about the hinges 12—12' remaining at the grooves, to assume a depending position substantially at right angles to the web 10, and therewith assume a channel-like form. It will also be understood that the width of the flanges 11—11' and the thickness thereof is so proportioned relative to the strength and thickness of the materials at the hinges 12—12' that the flanges are aided thereby in assuming and maintaining their normal operative vertically depending positions.

Fig. 4 illustrates the manner in which the trolley wire guard is mounted into guarding position by means of the conventional trolley wire hangers, which comprise the hanger head 17, clamping jaws 18 holding the trolley wire 19 and bolt 20. Suitable openings are formed in the web portion 10 to receive the bolts 20, and the web is then secured firmly in position between suitable washers 21 and 22 against the hanger head 17 by means of the nut 23, with the grooves 16—16' opening downwardly, so that the flanges turn about their hinges and form curtains.

The width of the web 10 is sufficient to hold the flanges 11—11' spaced apart to allow the trolley wheel and pole (not shown) sufficient clearance to operate freely. The flanges 11—11' are of sufficient width, so that when they hang vertically they are of a length which terminates well below the trolley wire 19. Thus when, for example, the flange 11 as shown in Fig. 5 is struck laterally by the head of a workman, it flexes inwardly and under the trolley wire to completely enclose it and protect him from accidental contact therewith. It will also be seen that if the trolley pole should jump the trolley wire, the curtain will, due to its inherent construction and positioning, readily flex and give it freedom without damage to either the pole or the guard, and repositioning of the pole with its wheel within the curtains of the guard can worthwith be carried out with the customary ease.

It is also again pointed out that my improved guard is ready for use in the flat form shown in Fig. 2 and can in that form be economically shipped and stored either flat or in flat rolls in any suitable length, and due to its grooved construction, readily assumes a guarding shape when positioned on the trolley hangers by means of their bolts, as hereinbefore described.

I claim as my invention:

1. A trolley wire guard comprising an elongated flexible rubber sheet, the internal face thereof being formed with a pair of spaced apart grooves extending longitudinally thereof and dividing said sheet into a central web portion and a pair of curtain portions, the said web portion being adapted to be horizontally mounted and the said curtain portions being adapted to hingedly depend therefrom.

2. A trolley wire guard comprising an elongated flexible rubber sheet, one face thereof being formed with a pair of spaced apart grooves extending longitudinally thereof and dividing said sheet into a central web portion and a pair of curtain portions, the said web portion being adapted to be suspended horizontally and the said curtain portions being adapted to depend substantially vertically thereto from said grooved areas as hinges.

3. A trolley wire guard comprising a flexible elongated rectangular sheet having at least one thickness of rubber, the said thickness of rubber being formed with a pair of spaced apart grooves extending longitudinally of said sheet to form a central section of relatively narrower width and a pair of outer sections of equal width to each other and of relatively greater width than said central section, the said outer sections being adapted to depend substantially perpendicularly from said central section when suspended horizontally, and remain hinged thereto by means of thicknesses of material remaining at said grooved portions.

4. A trolley wire guard comprising a flexible elongated rubber sheet having a fabric reinforcement embedded therein adjacent one face thereof, the opposed face being provided with a pair of spaced apart grooves extending longitudinally thereof and defining a central web portion and a pair of flange portions, the said web portion being adapted to be positioned horizontally and the said flange portion being adapted to hingedly depend therefrom in a substantially vertical position.

5. A trolley wire guard comprising a flexible elongated sheet formed with a thickness of rubberized fabric adjacent the outer face thereof and a thickness of rubber extending to the inner face thereof, the said thickness of rubber being provided with a pair of spaced apart longitudinally extending grooves defining a central web portion and a pair of outer flange portions, the depth of said grooves extending substantially through said thickness of rubber, the said web being adapted to be suspended in a horizontally extended position with the grooves opening downwardly therefrom, and the said flanges being adapted to depend therefrom about the material at the base of said grooved areas as hinges.

6. A trolley wire guard comprising an elongated flexible sheet of rubber having embedded therein adjacent to one surface thereof a thickness of woven textile fabric and formed with a pair of spaced apart longitudinally extending substantially semi-circular cross-sectioned grooves opening to the opposed sheet face, the depth of said grooves extending substantially to the said fabric thickness, the said grooved areas defining a central web portion and a pair of flange portions, the said web portion being adapted to be extended and suspended horizontally with the groove openings extending downwardly thereof, and the said flange portions being adapted to hingedly pivot therefrom about said grooved areas as an axis and to depend from said web in substantially perpendicular relationship.

7. A trolley wire guard comprising an elongated flexible substantially channel shaped member formed of a unitary sheet of rubber and having embedded therein adjacent the outer surface thereof a textile fabric strength member, the points of juncture between the web and the flanges thereof being defined by lines of reduced rubber thickness and forming hinges of greater flexibility than the body of said sheet of rubber.

8. The combination with an overhead trolley wire suspended from conventional hangers therefor of a trolley wire guard comprising an elongated flexible substantially channel shaped member formed of rubber sheet material, the points of juncture between the web and the flanges thereof being defined by lines of reduced rubber thickness and forming hinges of greater flexibility than the body of said sheet of rubber, the said web being horizontally suspended above said trolley wire by means of the hangers therefor and the said flanges hingedly depending from said web in spaced apart relationship to each other and to said trolley wire and in lateral guarding relationship therewith.

9. The combination with an overhead trolley wire suspended from conventional hangers therefor of a trolley wire guard comprising an elongated flexible substantially channel shaped member formed of a unitary sheet of rubber and having embedded therein adjacent the outer surface thereof a textile fabric strength member, the points of juncture between the web and the flanges thereof being defined by integral hinges of greater flexibility than said sheet body formed by a pair of spaced apart longitudinally extending grooved areas opening onto the under side of said guard and extending substantially to said embedded fabric, the said web being horizontally suspended above said trolley wire by means of the hanger thereof and the said flanges hingedly depending from said web in spaced apart relationship to each other and to said trolley wire and in lateral guarding relationship therewith.

JAMES G. GROENDYK.